Aug. 5, 1969       W. B. PRESCOTT ET AL       3,459,480
   MODIFIED FLICKERING BEAM SPECTROPHOTOMETER
              PRODUCING DIGITIZED OUTPUT
Filed Dec. 31, 1964                    2 Sheets-Sheet 1

United States Patent Office 3,459,480
Patented Aug. 5, 1969

3,459,480
MODIFIED FLICKERING BEAM SPECTROPHO-
TOMETER PRODUCING DIGITIZED OUTPUT
William Benjamin Prescott, Bridgewater Township,
Somerset County, and Henry C. Lawrence, Warren
Township, Somerset County, N.J., assignors to Ameri-
can Cyanamid Company, Stamford, Conn., a corpora-
tion of Maine
Filed Dec. 31, 1964, Ser. No. 422,847
Int. Cl. G01j 3/42, 3/46
U.S. Cl. 356—90     4 Claims

ABSTRACT OF THE DISCLOSURE

A flickering beam spectrophotometer is modified by driving the photometering polarizing element linearly from a motor actuated by flicker frequency differential signal from sample and reference beam, the same motor driving also linearly an analog to digital encoder to produce digitized spectrophotometric measurements at different wavelengths throughout the spectrum. Preferably the encoder encodes at a predetermined number of wavelengths and encoding readout is effective at the proper wavelengths by drive from the spectrophotometer monochromator.

RELATED APPLICATIONS

An application of Grethlein and Prescott, Ser. No. 422,846, filed Dec. 31, 1964, owned by the assignee of the present application, is directed to a color matching process in which digitalized values which are a function of transmittance at a plurality of selected wavelengths are fed to a standard digital computer which is programmed to give outputs from which color matching formulae can be read out. While the present application does not claim this process, it does describe and claim a modified spectrophotometer which can produce these digitalized values. In other words, the present application is directed to one kind of apparatus for producing quantities which can be used in the process of the Grethlein and Prescott application.

BACKGROUND OF THE INVENTION

This invention relates to an improved flickering beam spectophotometer and a combination of the improved spectrophotometer with a converter producing a digitalized output. More particularly, the type of flickering beam spectrophotometer is one in which polarized light is utilized.

Flickering beam spectrophotometers have been used extensively to produce outputs, usually in the form of a curve, representing transmission or reflectance of a sample at different wavelengths or functions thereof such as, for example, functions which produce curves of invariant shape with variations of concentration of coloring matters investigated. A typical, and still the standard form of flickering beam spectrophotometer, is described and claimed in the patent to Pineo, No. 2,107,836. The present invention changes the Pineo spectrophotometer only in certain parts in order to produce an improved instrument for combination with a digital computer of conventional design. Accordingly, those parts of the Pineo spectrophotometer which are not changed by the present invention will be described only very briefly and shown on the drawings in diagrammatic form only. Detailed constructional features are described in the Pineo patent referred to above.

Essentially in a standard Pineo flickering beam spectrophotometer a source of light is passed through a monochromator, normally a double monochromator of the van Cittert type, with a movable mirror which causes narrow bands of light though the spectrum to be emitted through the exit slit of the monochromator. This mirror is slowly moved by a motor which, in the standard machine, drives a recording surface, such as a drum. The monochromatic light from the monochromator passes through a Rochon prism which, for the zero position is at 45° to the axis of the beam. This plane polarizes the light in a particular plane. The light then passes through a Wollaston prism which splits the light into two divergent beams, plane polarized at right angles to each other, and, in the zero position, of equal intensity. The two beams then pass through a rotating Rochon prism which is rotated by a synchronous motor at a speed which results in the two beams flickering at a particular frequency, usually 60 ~, from minimum to maximum 180° out of phase. In some modified spectrophotometers the flickering mechanism may be something different than a Rochon prism such as a rotating half wave plate and a stationary Rochon. The two beams then pass through a transmission sample and reference chamber and then into an integrating sphere. In transmittance measurements one beam passes through a standard or reference material and the other through the sample to be measured. In the case of reflectance the chambers are empty and the two beams strike standards or sample in the back of the integrating sphere. As a result if the two beams are of the same intensity there will be no light in the integrating sphere pulsing the flicker frequency. A photomultiplier tube is placed to receive integrated light from the sphere and is connected through an exceedingly high gain, flicker frequency amplifier to a motor which drives non-linearly the first or photometering Rochon prism, the motor field of course, is at line frequency and phase as is the motor which rotates the flickering means. If there is any unbalance between the intensities in the two flickering beams there will be a flicker frequency signal from the photomultiplier tube in phase with the stronger beam. After amplification, this turns the first Rochon prism until balance is again restored.

In the standard spectrophotometer, the first Rochon prism is driven from a cam of suitable profile because the attenuating effect of turning the Rochon prism is in proportion of the square of the tangent of the angle through which it is rotated. Ordinarily a recording mechanism such as a stylus is driven across the recording surface so that its position corresponds to transmission of a sample in one of the beams. Other special cam profiles provide for plotting of different functions other than the straight tangent square functions.

SUMMARY OF THE INVENTION

The present invention deals with modifications of a flickering-beam spectrophotometer to produce digitalized values corresponding to a function of transmittance at a plurality of selected wavelengths. These values can be used as part of the input in the color matching process of the Grethlein and Prescott application above referred to.

In the Grethlein and Prescott color matching process, transmittance values or values related to transmittance at a number of selected wavelengths, for example 31, are fed into the digital computer. A standard spectrophotometer may be considered as an analog computer, one of the coordinates of the output curve representing the transmittance or a function thereof at the particular wavelength. Transforming analog computer outputs to digital outputs can be effected by standard procedures, among which the most effective is an encoding disc, such as for example one produced and marketed by the Datex Company under their designation "type 03–505–36." This disc translates rotational position into an output in binary notation. While the present invention is not limited to any particular make of encoder disc, the type referred to will be described as it is a very suitable one.

An analog to digital encoder disc usually has a relatively large number of positions. The one referred to above has 1100 sequentially identifiable positions, of which ordinarily a lesser number such as 1000 are used for actual measurement. The other portions of the discs produce numbers for other code purposes. The accuracy of computer results is of course absolutely dependent on the accuracy of the digitalized inputs which it receives. However, the ordinary spectrophotometer drive for the photometering Rochon prism presents a possibility of error when the encoding disc is driven by the shaft of the photometering motor. There are problems of backlash, difficulty of precise following at certain positions of the profile of the inverse tangent squared cam, dynamic inertia, and the like. These are all sources of possible error and, hence, inaccuracy. In one aspect of the invention, an enormous increase in accuracy and speed is obtained by eliminating the tangent squared cam function altogether and driving the photometering prism directly. Rotation of the photometering Rochon prism through an angle of 45° provides attenuation of one of the beams from 0 to 100%. A standard encoder disc rotates through a much larger angle, for example 300° or more. The encoder disc is driven through accurate gears which may, for example, have a 6 to 1 ratio coupled to the photometering prism drive. Gears with negligible backlash are readily available for precision instruments. At first glance it would appear that this modification is a step in the wrong direction because the digital encoder disc now will produce a number which is not transmittance but which involves a tangent squared function of transmittance. Such an output, by itself, is not useful for color matching purposes. However, when combined with a standard digital computer perfect results can be obtained merely by programming into the computer additional operations which are involved in the tangent squared calculation and so restores values of transmittance which can further be processed in the computer.

Because of the relatively enormous speed of the digital computer in comparison to the very moderate speeds of the parts of the spectrophotometer the additional functions do not involve any delay. A color matching system requires the digital computer in any event and to add some functions which the computer performs increases neither cost nor time. Thus, the overall result produces exactly the same information as would be obtained from a drive using the standard tangent squared cam but at the same time eliminates all of the inaccuracies due to the cam drive as pointed out above. Also, since the time for running through the spectrum is limited by the rate at which the cam follower can follow the profile of the inverse tangent squared cam, a marked increase in or rather a marked decrease in the time for spectrophotometer operation is obtained with the higher accuracy and at no additional cost.

It is unusual when the deliberate elimination of a part of a machine which performs a vital and useful function results in a more accurate operation and one which can be effected more rapidly. However, in the present invention these additional advantages are obtained without offsetting disadvantages.

A second aspect of the invention which deals only with the spectrophotometer and is not involved with the combination of spectrophotometer and digital computer as is the first aspect, lies in the transformation of the analog results to digital results itself. If a standard encoder disc is used the areas beyond the zero to 1099 positions give out code signals which do not determine how much a particular position may be below zero or above 1099. This problem is not raised with the cam operated drive because the cam has a built-in accurate zero. However, when the cam drive is not used there is a problem of spectrophotometer zero determination and the present invention solves this by locating the spectrophotometer zero at a position somewhat up from zero on the encoder disc, for example at 30. Then the ultimate output will show no error because the encoder disc is indicating the difference between two positions and this, of course, has exactly the same value even though the instrument zero corresponds to a definite encoder position such as 30. Drift or slip which would move the position of the encoding disc by a number of positions, no longer have any effect whatever. The machine gives an accurate result without knowing or caring whether there has been any small displacement of the zero position. This further adds to the accuracy of the instrument.

Preferably both aspects of the invention are used together as this gives the best possible accuracy and speed. However, either aspect may be used alone except of course that the first aspect, that is to say the elimination of any cam, is effective only if the digital computer is properly programmed.

Reference has been made to measurements in the Grethlein and Prescott system at certain preselected wavelengths. Strictly speaking, this does not alter either aspect of the present invention but it is simply included in a modified spectrophotometer by having the monochromator wavelength drive turn a disc which issues read-out commands at certain positions, that is to say at certain wavelengths. Except at these positions there will be no read-out from the encoder disc driven by the photometering motor. In the specific description which will follow such a more sophisticated device will be described.

DESCRIPTION OF THE PREFERRED EMBODIMENTS

Figure 1:
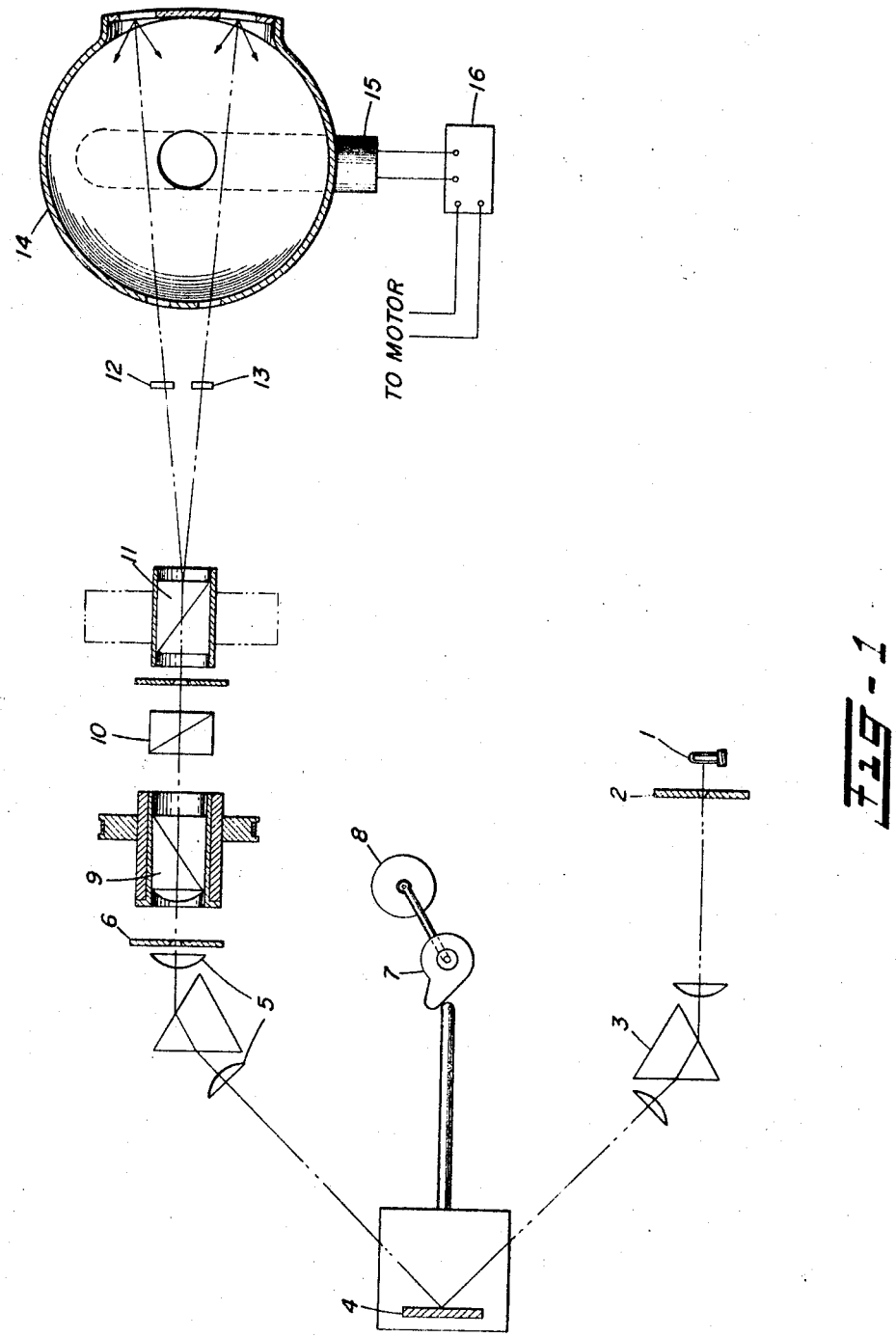
FIGURE 1 is a diagrammatic representation of a spectrophotometer with wavelength encoder for giving out readout commands.

In FIGURE 1 a spectrophotometer lamp is shown at 1 with a suitable entrance slit 2, first lenses and prism 3, movable mirror 4 and second assembly of lenses and prism 5. An exit slit is shown at 6 and the mirror 4 is driven by a wavelength cam 7, the shaft of which also drives a wavelength readout command encoder disc 8. The motor for the driving wavelength cam is not shown as this is conventional and is not changed by the present invention. It will be noted that the monochromator is in the form of a double van Cittert monochromator.

Figure 2:
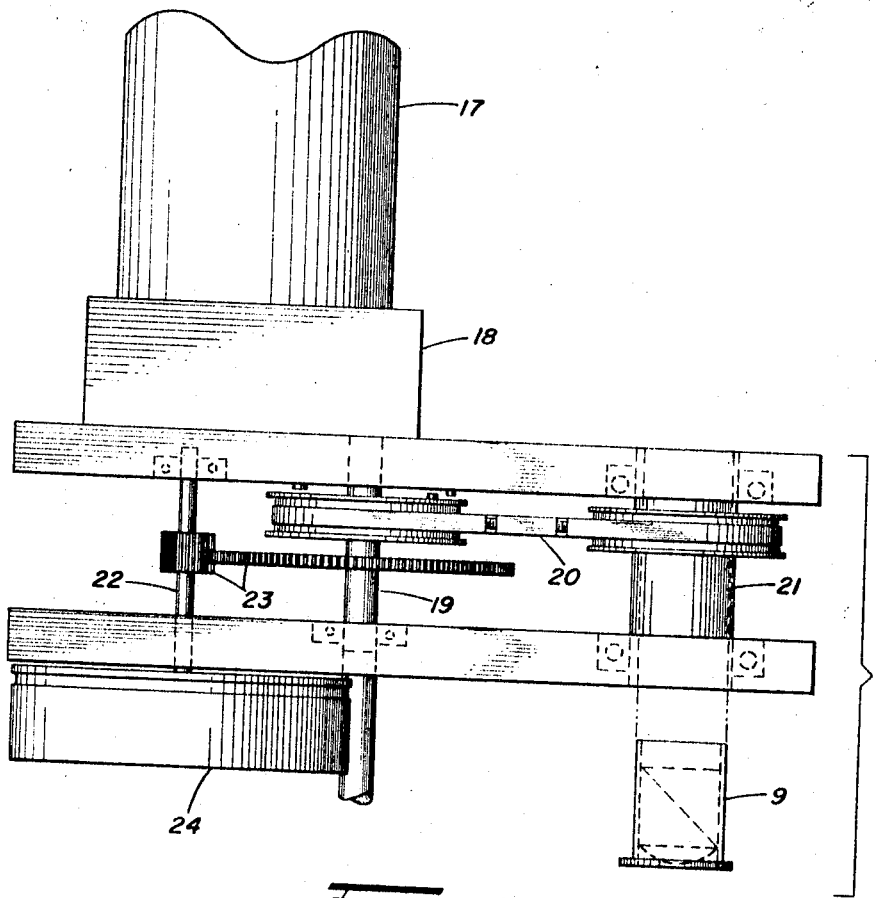
FIGURE 2 is a detail on the photometering Rochon drive.

The light beam leaving the exit slit 6 of the monochromator passes through a photometering Rochon prism 9 which is shown in FIGURE 1 as part of a photometering assembly. The construction of this assembly is shown in more detail in FIGURE 2 but is omitted in FIGURE 1 for the sake of clarity. After passing through the photometering Rochon prism, the beam passes through a Wollaston prism 10 which splits it into two diverging beams, plane polarized at right angles to each other. These beams then pass through a rotating Rochon prism 11 which causes them to flicker in opposite phases. The motor driving the rotating Rochon prism is not shown for clarity as it is a conventional synchronous motor.

The two flickering beams pass through transmission cells 12 and 13, the second of which contains a dyestuff solution from which data is to be extracted. Both beams enter conventional integrating sphere 14 and integrated light is received by a photomultiplier tube 15 which is connected to the input of a high gain, flicker frequency amplifier 16, the output of which is connected to a photometering motor 17 shown in FIGURE 2.

The motor 17 drives a shaft 19 through precision reduction gearbox 18 and the latter drives through a taut band 20, a sleeve 21 in which the photometering prism 9 is located. For clarity this is shown in exploded form outside of the sleeve. The shaft 19 drives a second shaft 22 through prevision antibacklash gears 23 having a ratio of approximately 6 to 1. On shaft 22 is located a conventional Datex encoder disc 24 which, however, is displaced on the shaft to a point where the zero position of the Rochon prism 9 corresponds to a count that is not zero on the encoder, for example count 30. The encoder disc rotates through about 270° and is provided with 1100 positions permitting about 1000 counts by the differential method described above.

Figure 3:
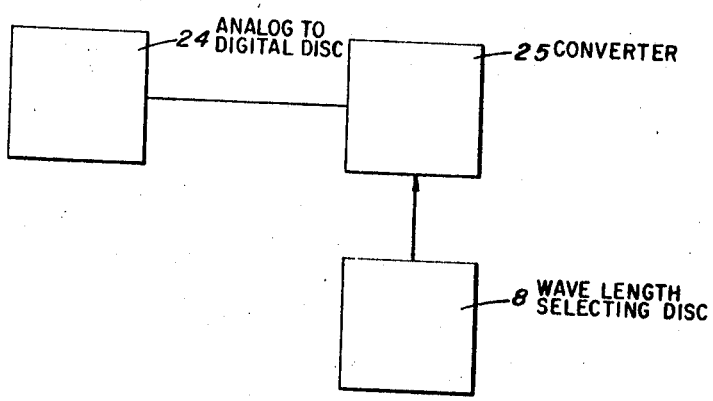
FIGURE 3 is a block diagrammatic representation of the functions performed.

FIGURE 3 illustrates diagrammatically the connection from the disc 24 to a digital converter of conventional design 25. The converter reads out only on command from the wavelength selecting encoder disc 8, shown in FIGURE 1. In other words, the output is at predetermined wavelengths. As has been pointed out above the digital computer must be programmed so that in addition to its other functions in the Grethlein and Prescott process it also translates data from the converter 25 into transmittance data by the tangent squared function.

It will be noted that the only portions of the spectrophotometer which have been changed by the present invention involve the photometering Rochon drive and the readout encoder disc from the wavelength drive. Thus it is of course of no concern to the invention of what particular design of the other elements are, for example a different form of monochromator may be used, a different flickering means or a different light integrating means. The illustrated spectrophotometer which is in accordance with the Pineo patent above referred to is, therefore, only described as a typical example.

We claim:

1. In a system comprising a polarized light flickering beam spectrophotometer having a photometering Rochon prism and means for introducing a sample to be photometered into one beam and means driven in accordance with beam differences to move the photometering Rochon prism to balance, the improvement which comprises:

(a) means for driving the photometering Rochon prism linearly from the means driven in accordance with beam differences.
(b) an analog to digital encoder and means for driving the encoder linearly with respect to said Rochon driving means, and
(c) a digital computer having an input and means for connecting the encoder output to the digital computer input.

2. A system according to claim 1 in which digital information at preselected wavelengths is effected by:

(a) means driven in accordance to the particular wavelength passing through the spectrophotometer and capable of giving electrical output, and
(b) means responsive to said electrical output for actuating the means for connecting the encoder output to the digital computer input wherein said encoder output is connected to said digital computer input only at certain preselected wavelengths.

3. A system according to claim 1 in which the analog to digital encoder has a position corresponding to zero position of the photometering Rochon prism located at a point corresponding to a positive postion whereby encoder output is a difference between two positions and is unaffected by zero position shift.

4. A system according to claim 2 in which an analog to digital encoder has a position corresponding to zero position of the photometering Rochon prism located at a point corresponding to a positive position whereby encoder output is a difference between two positions and is unaffected by zero position shift.

References Cited

UNITED STATES PATENTS 2,218,357  10/1940  Pineo.

RONALD L. WIBERT, Primary Examiner

V. P. McGRAW, Assistant Examiner

U.S. Cl. X.R.

356—93, 96, 179